United States Patent
Uda

(10) Patent No.: US 7,393,483 B2
(45) Date of Patent: Jul. 1, 2008

(54) PROCESS FOR PRODUCTION OF POLY(M-PHENYLENEISOPHTHAL-AMIDE) POROUS HOLLOW FIBER MEMBRANE

(75) Inventor: Toru Uda, Fujisawa (JP)

(73) Assignee: NOK Corporation, Tokyo (JP)

( * ) Notice: Subject to any disclaimer, the term of this patent is extended or adjusted under 35 U.S.C. 154(b) by 442 days.

(21) Appl. No.: 10/506,489

(22) PCT Filed: Aug. 29, 2003

(86) PCT No.: PCT/JP03/11062

§ 371 (c)(1),
(2), (4) Date: Sep. 2, 2004

(87) PCT Pub. No.: WO2004/024305

PCT Pub. Date: Mar. 25, 2004

(65) Prior Publication Data

US 2005/0170176 A1    Aug. 4, 2005

(30) Foreign Application Priority Data

Sep. 9, 2002    (JP) .............................. 2002-262251

(51) Int. Cl.
*B29C 67/20* (2006.01)
*D01D 5/24* (2006.01)
*B01D 39/02* (2006.01)

(52) U.S. Cl. ................. 264/49; 264/209.1; 264/211.14; 210/500.21; 210/500.23

(58) Field of Classification Search ................ 264/49, 264/209.1, 211.14; 210/500.21, 500.23
See application file for complete search history.

(56) References Cited

U.S. PATENT DOCUMENTS 3,899,309 A * 8/1975 Hoehn et al. .................... 95/54
5,091,080 A * 2/1992 van Eikeren et al. ........ 210/188
5,859,175 A   1/1999 Blatter et al.
6,355,730 B1 * 3/2002 Kozawa et al. .............. 525/189

FOREIGN PATENT DOCUMENTS

| EP | 0 781 593 A2 | 12/1996 |
|---|---|---|
| JP | 10-52631 | 6/1997 |
| JP | 2001-286743 | 10/2000 |

\* cited by examiner

*Primary Examiner*—Christina Johnson
*Assistant Examiner*—Patrick Butler
(74) *Attorney, Agent, or Firm*—Butzel Long

(57) ABSTRACT

A polymetaphenylene isophthalamide porous hollow fiber membrane is produced by extruding a film-forming solution comprising polymetaphenylene isophthalamide, polyvinylpyrrolidone and an inorganic salt through a concentric double annular spinning nozzle while keeping the film-forming solution at 70° C. or higher, thereby conducting dry-and-wet spinning, followed by moisture retention treatment, where it is preferable to subject the resulting porous hollow fiber membrane obtained by dry-and-wet spinning to heat treatment in water at 80° C. or higher before the moisture retention treatment. The polymetaphenylene isophthalamide porous hollow fiber membrane resulting from wet heat treatment under wet heat conditions at the temperature of 100° C. and the humidity of 8% for 1,000 hours or more has a strength at break of 10 MPa or more and a elongation at break of 80% or more, where the elongation at break can keep at least 80% as high as that before the wet heat treatment, and also has distinguished resistance to moisture and heat and humidifying performance, so that the membrane can be used as an effective humidifying membrane for polymer electrolyte fuel cells, etc.

7 Claims, No Drawings

US 7,393,483 B2

PROCESS FOR PRODUCTION OF POLY(M-PHENYLENEISOPHTHAL-AMIDE) POROUS HOLLOW FIBER MEMBRANE

TECHNICAL FIELD

The present invention relates to a process for producing a polymetaphenylene isophthalamide porous hollow fiber membrane, and more particularly to a process for producing a polymetaphenylene isophthalamide porous hollow fiber membrane effectively applicable to a humidifying membrane for polymer electrolyte fuel cells, etc.

BACKGROUND ART

Solid polymer electrolyte membrane for use in polymer electrolyte fuel cell shows an ion conductivity only in a state involving water molecules to some extent, and thus its power generation efficiency abruptly decreases when the electrolyte membrane is dried. When the electrolyte membrane is too much wetted with water, on the other hand, the membrane fails to conduct gas diffusion therethrough, resulting in a decrease in the power generation efficiency. Thus, to attain a high and stable power output, the electrolyte membrane must be appropriately humidified. The electrolyte membrane can be humidified by a bubbler humidification system, a water vapor addition system, a humidifying membrane system, etc., among which the humidifying membrane system for humidifying the electrolyte membrane by transporting only water vapor contained in an exhaust gas into a feed gas through a selectively water vapor permeating membrane, that is, a humidifying membrane system is expected to be highly promising because of a possibility to make the humidifier compact in volume and light in weight.

Desirable shape of the humidifying membrane for use in the humidifying membrane system is a hollow fiber membrane having a larger permeation area per unit volume in the case of membrane modules. Very high humidifying capacity is required for humidification of the electrolyte membrane of fuel cells, particularly fuel cells for mobile unit, and thus a porous membrane state is desirable for the hollow fiber membrane because a high permeation rate can be obtained by capillary condensation of water vapor and because the capillary condensation of water vapor can act as a barrier against other gases.

To obtain such a porous membrane, the present applicant formerly proposed a process for producing a polymetaphenylene phthalamide separation membrane by extruding a film-forming solution of polymetaphenylene isophthalamide made by a low-temperature polycondensation process, the solution also containing a water-soluble polymer and an inorganic salt, into a coagulation bath under heating conditions at 70° C. or higher, thereby coagulating the solution (JP-A-2001-286743).

On the other hand, such durability as to ensure a prolonged operation is required for fuel cells, particularly fuel cells for mobile unit, and thus a resistance to moisture and heat without any deterioration, even if subjected to high temperature and high humidity circumstances for a long time, is also required for the humidifying membrane. However, to satisfy the resistance to moisture and heat renders a humidifying membrane low in the humidifying performance, and thus it is difficult to satisfy the two requirements at the same time, i.e. resistance to moisture and heat and humidifying performance.

DISCLOSURE OF THE INVENTION

An object of the present invention is to provide a process for producing a polymetaphenylene isophthalamide porous hollow fiber membrane having distinguished resistance to moisture and heat and humidifying performance for use as an effective humidifying membrane for polymer electrolyte fuel cells.

The object of the present invention can be attained by extruding a film-forming solution comprising polymetaphenylene isophthalamide, polyvinylpyrrolidone and an inorganic salt through a concentric double annular spinning nozzle, while maintaining the film-forming solution at a temperature of 70° C. or higher, thereby conducting dry-and-wet spinning, followed by moisture retention treatment, thereby producing a polymetaphenylene isophthalamide porous hollow fiber membrane. Preferably, after the dry-and-wet spinning and before the moisture retention treatment, the resulting porous hollow fiber membrane is subjected to heat treatment in water at 80° C. or higher.

In the present invention, polymetaphenylene isophthalamide having the following repeating unit is used:

Actually, commercially available products such as Normex, a product made by DuPont, Cornex, a product made by Teijin Technoproduct, etc. can be used. Polymetaphenylene isophthalamide can be used in a proportion of about 12 to about 35 wt. %, preferably 14 to 25 wt. % on the basis of a film-forming solution comprising polymetaphenylene isophthalamide, additives and an organic solvent. When polymetaphenylene isophthalamide is used in a proportion of less than about 12 wt. %, the fractional molecular weight of the membrane is increased, so that the gas leakage rate is increased, that is, the gas barrier performance is lowered, in spite of distinguished humidifying performance. In a proportion of more than about 35 wt. %, on the other hand, the humidifying performance is lowered in spite of distinguished gas barrier performance.

Polyvinylpyrrolidone having an average molecular weight of about 20,000 to about 100,000, preferably about 30,000 to about 50,000, can be used in a proportion of about 4 to about 10 wt. %, preferably about 6 to about 8 wt. %, on the basis of the film-forming solution. When polyvinylpyrrolidone is used in a proportion of less than about 4 wt. %, the water vapor permeation rate is lowered and the fractional molecular weight of the membrane is increased, resulting in an increase in the gas leakage rate. In a proportion of more than about 10 wt. % the solubility of meta-type aramid is lowered and the viscosity of the film-forming solution is much increased, resulting in a decrease in spinning stability. When the average molecular weight of polyvinylpyrrolidone is less than about 20,000, the humidifying performance and gas barrier performance are decreased, whereas in case that the average molecular weight is more than about 100,000, the viscosity of the film-forming solution is increased, resulting in difficult spinning.

Inorganic salt for use in the present invention includes halides such as calcium chloride, lithium chloride, sodium chloride, potassium chloride, magnesium chloride, zinc chloride, aluminum chloride, sodium bromide, etc., nitrates such as potassium nitrate, zinc nitrate, aluminum nitrate, etc., carbonates such as potassium carbonate, etc., and thiocyanates such as potassium thiocyanate, etc., or the like, and at least one of these inorganic salts can be used. Preferably, calcium chloride or a mixture of calcium chloride and lithium chloride are used. In case of using a mixture of calcium chloride and lithium chloride, lithium chloride is used in a proportion of 50 wt. % or less on the basis of the mixture. The inorganic salt is used in a proportion of about 4 to about 10 wt. %, preferably about 6 to about 8 wt. % on the basis of the film-forming solution. When the inorganic salt is used in a proportion of less than about 4 wt. %, the humidifying performance and the barrier performance against other gases are lowered, whereas in case of a proportion of more than about 10 wt. %, on the other hand, precipitation of the inorganic salt takes place or solubility of meta-type aramid in an organic solvent is lowered.

As an organic solvent for dissolving the afore-mentioned components while remaining as a balance in the film-forming solution, an aprotic polar solvent can be used such as dimethyl formamide, diethyl formamide, dimethyl acetamide, diethyl acetamide, N-methyl-2-pyrrolidone, dimethyl-imidazolidinone, etc., among which dimethyl acetamide is preferably used.

Production of a porous hollow fiber membrane by dry-and-wet spinning of a film-forming solution comprising polyphenylene isophthalamide, an inorganic salt and a water-soluble polymer such as polyvinylpyrrolidone, etc. is disclosed in JP-A-10-52631, etc., where the dry-and-wet spinning is carried out at room temperature. Dry-and-wet spinning at room temperature results in a decrease in separation factor, i.e. a ratio of air permeation rate to water vapor permeation rate, whereby a porous hollow fiber membrane with lower humidifying performance is produced, as shown in Comparative Example 4 described later.

In the present invention, on the other hand, a film-forming solution comprising polymetaphenylene isophthalamide, polyvinylpyrrolidone and an inorganic salt is prepared as a uniform, single phase solution and then extruded through a concentric double annular spinning nozzle, while maintaining the film-forming solution at a temperature of 70° C. or higher, preferably 90° to 110° C., thereby conducting dry-and-wet spinning.

Maintenance of the film-forming temperature at such a high temperature can be attained generally by heating a film-forming solution tank, pipings and the concentric double annular spinning nozzle each to such a temperature. Below 70° C., the viscosity of the film-forming solution is increased, resulting in difficult film forming, or the resulting porous hollow fiber membrane, even if formed, has low humidifying performance and barrier performance against other gases.

In the dry-and-wet spinning, water or an aqueous solution such as an aqueous polyvinylpyrrolidone solution, etc. can be used as a core liquid, while an aqueous solution, typically water, is used for the coagulation bath.

It is preferable to subject the resulting dry-and-wet spun porous hollow fiber membrane to heat treatment in water at 80° C. or higher, preferably 80° to 121° C. Heat treatment time generally depends on the circumstances in which the porous hollow fiber membrane is used. Higher the heat treatment temperature, the shorter the heat treatment time. For example, heat treatment is carried out at 80° C. for about 24 hours or at 121° C. for about one hour.

Generally, the polymetaphenylene isophthalamide porous hollow fiber membrane is susceptible to large heat shrinkage, and thus when used in high-temperature circumstances the membrane modules have a possibility of breakage but such a possibility can be prevented by the heat treatment.

In the present invention, the film-forming solution contains an inorganic salt, and when the inorganic salt remains in the membrane, there is a possibility of dissolution of remaining inorganic ions from the membrane, the inorganic ions acting as the main factor of decreasing fuel cell power output, but such a possibility can be also prevented by the heat treatment.

The dry-and-wet spun, preferably further heat-treated porous hollow fiber membrane is dipped into an aqueous solution of a moisture-retentive agent at a concentration of about 5 to about 50 wt. %, preferably about 10 to about 30 wt. %, to conduct moisture retention treatment. The moisture-retentive agent for use in the prevent invention includes polyhydric alcohols such as glycerin, ethylene glycol, propylene glycol, polyglycerin, etc., and polyvinylpyrrolidone, etc.

BEST MODES FOR CARRYING OUT THE INVENTION

The present invention will be described below, referring to Examples.

EXAMPLE 1

|  | % by weight |
|---|---|
| Polymetaphenylene isophthalamide (Normex, made by DuPont) | 16.39 |
| Calcium chloride | 9.06 |
| Polyvinylpyrrolidone (average molecular weight 40,000) | 3.64 |
| Dimethyl acetamide | 70.91 |

A film-forming solution in a uniform single phase state consisting of the above-mentioned components was subjected to dry-and-wet spinning through a film-forming solution tank, pipings and a concentric double annular spinning nozzle, each being heated to and kept at 100° C. and extruded into a coagulation water bath at 25° C. After the passage through the water bath, the extruded membrane was coiled around a roll. Then, the resulting porous hollow fiber membrane was dipped into an aqueous 20 wt. % glycerin solution for 12 hours, and then thoroughly dried.

Two polymetaphenylene isophthalamide porous hollow fiber membranes (outer diameter: 680 μm and inner diameter: 450 μm) thus obtained were inserted into a branched metallic tube (stainless steel tube with T-type tubular joints in opposite directions to each other as connected to both ends of the metallic tube, respectively) and then the porous hollow fiber membranes were sealed at both ends with an epoxy resin-based adhesive to make an effective length of the membranes therein 15 cm, to form a pencil module.

Wet air at the temperature of 80° C. and the humidity of 80% was fed to the insides of the porous hollow fiber membranes at a flow rate of 0.25 NL/minute under pressure of 0.5 MPa, whereas sweep air at the temperature of 80° C. and the humidity of 0% was made to flow along the outsides of the membranes at a flow rate of 0.28 NL/minute under pressure of 1.2 MPa. The sweep air humidified with water vapor, which was permeated through the porous hollow fiber membranes from the insides to the outsides, was then passed through a cooled trap pipe to collect the trapped water vapor condensate from the sweep air. Water vapor permeation rate ($P_{H2O}$) as an index of humidifying performance was determined from the weight of the collected water vapor condensate.

Furthermore, dry air at the temperature of 80° C. was fed into the insides of the porous hollow fiber membranes in the module in a dead-end manner under pressure of 0.2 MPa to determine the volume of air permeated through the porous hollow fiber membranes from the insides to the outsides, and air permeation rate ($P_{AIR}$) and separation factor ($\alpha_{H2O/AIR}$), i.e. a ratio of air permeation rate to water vapor permeation rate, were determined therefrom.

Still furthermore, the porous hollow fiber membrane was placed into a temperature and humidity-controlled incubator at the temperature of 100° C. and the humidity of 80% and subjected to wet heat treatment for 1,000 hours, and then to a tension test (gage length: 50 mm and tensile speed: 30 mm/minute) to determine a strength at break and a elongation at break, and also a percent elongation at break retention, i.e. a ratio of elongation at break after the wet heat treatment to that before the wet heat treatment, was determined.

COMPARATIVE EXAMPLE 1

In Example 1, it was tried to prepare a film-forming solution without using calcium chloride and polyvinylpyrrolidone, but it was found that polymetaphenylene isophthalamide was only swollen and not dissolved into dimethyl acetamide.

COMPARATIVE EXAMPLE 2

In Example 1, it was tried to prepare a film-forming solution without using calcium chloride, but it was found that polymetaphenylene isophthalamide was only swollen and not dissolved into dimethyl acetamide.

COMPARATIVE EXAMPLE 3

In Example 1, it was tried to prepare a film-forming solution without using polyvinylpyrrolidone, but it was found that the film-forming solution turned white-turbid at 70° C. or higher and was separated into two phases.

COMPARATIVE EXAMPLE 4

In Example 1, the film-forming solution was subjected to the dry-and-wet spinning at room temperature (25° C.) without heating the film-forming solution tank, the pipings and the concentric double annular spinning nozzle, and the resulting polymetaphenylene isophthalamide porous hollow fiber membrane (outer diameter: 700 µm and inner diameter: 480 µm) was subjected to the same determination as in Example 1.

COMPARATIVE EXAMPLE 5

In Example 1, polymetaphenylene isophthalamide porous hollow fiber membrane (outer diameter: 680 µm and inner diameter: 450 µm) obtained only by thoroughly drying the membrane without the moisture retention treatment was subjected to the same determination as in Example 1.

COMPARATIVE EXAMPLE 6

|  | % by weight |
|---|---|
| Polyamideimide | 20 |
| (Toron 4000T, a product of Amoco Japan) | |
| Polyvinylpyrrolidone (average molecular weight 40,000) | 4 |
| Dimethyl acetamide | 76 |

A film-forming solution in a uniform single phase state consisting of the above-mentioned components was subjected to dry-and-wet spinning through a film-forming solution tank, pipings and a concentric double annular spinning nozzle, each being kept at room temperature (25° C.) and then subjected to the same treatments as far as the moisture retention treatment as in Example 1. The resulting polyamideimide porous hollow fiber membrane (outer diameter: 650 µm and inner diameter: 420 µm) was subjected to the same determination as in Example 1.

Results of determinations and tests in Example 1 and Comparative Examples 4 to 6 are shown in the following Table 1.

TABLE 1

| Measurement items | | Ex. 1 | Comp. Ex. 4 | Comp. Ex. 5 | Comp. Ex. 6 |
|---|---|---|---|---|---|
| [Membrane performance] | | | | | |
| $P_{H2O}[cm^3(STP)/cm^2 \cdot sec \cdot cmHg]$ | | $3.7 \times 10^{-3}$ | $5.3 \times 10^{-4}$ | $5.4 \times 10^{-3}$ | $6.2 \times 10^{-3}$ |
| $P_{AIR}[cm^3(STP)/cm^2 \cdot sec \cdot cmHg]$ | | $7.6 \times 10^{-8}$ | $9.0 \times 10^{-7}$ | $4.1 \times 10^{-6}$ | $1.9 \times 10^{-8}$ |
| $\alpha_{H2O/AIR}$ | | 49000 | 580 | 1300 | 380000 |
| [Mechanical strength after wet heat treatment] | | | | | |
| Strength at break | (MPa) | 10.8 | 12.6 | 10.8 | 7.8 |
| Elongation at break | (%) | 88 | 75 | 86 | 15 |
| Percent elongation at break retention | (%) | 89 | 92 | 85 | 36 |

EXAMPLE 2

|  | % by weight |
|---|---|
| Polymetaphenylene isophthalamide | 16.2 |
| (Cornex, a product made by Teijin Technoproducts) | |
| Calcium chloride | 6.5 |
| Polyvinylpyrrolidone (average molecular weight 40,000) | 7.3 |
| Dimethyl acetamide | 70.0 |

A film-forming solution in a uniform single phase state consisting of the above-mentioned components was subjected to dry-and-wet spinning through a film-forming solution tank, pipings and a concentric double annular spinning nozzle, each being heated to and kept at 100° C., and extruded into a coagulation water bath at 25° C. and passed therethrough, followed by coiling around a roll. The resulting porous hollow fiber membrane coiled around the roll was cut to pieces, each 30 cm long, and subjected to autoclave heat treatment in ion-exchanged water at 121° C. for one hour. Then, the pieces of the porous hollow fiber membranes were washed with flowing ion-exchanged water and dried. Finally, the pieces of the porous hollow fiber membranes were dipped into an aqueous 20 wt. % glycerin solution for 12 hours as a moisture retention treatment and then thoroughly dried.

The pieces of the polymetaphenylene isophthalamide porous hollow fiber membranes (outer diameter: 680 μm and inner diameter: 450 μm) were subjected to determination of water vapor permeation rate ($P_{H2O}$), air permeation rate ($P_{AIR}$) and separation factor ($\alpha_{H2O/AIR}$) in the same manner as in Example 1.

EXAMPLE 3

In Example 2, the amount of calcium chloride was changed to 3.25 wt. %, and 3.25 wt. % of lithium chloride was further used. The resulting polymetaphenylene isophthalamide porous hollow fiber membrane (outer diameter: 680 μm and inner diameter: 450 μm) was subjected to the same determination as in Example 1.

EXAMPLE 4

In Example 2, a film-forming solution having the following composition was used.

|  | % by weight |
| --- | --- |
| Polymetaphenylene isophthalamide (Cornex) | 19.27 |
| Calcium chloride | 6.26 |
| Polyvinylpyrrolidone (average molecular weight 40,000) | 7.03 |
| Dimethyl acetamide | 67.44 |

The resulting polymetaphenylene isophthalamide porous hollow fiber membrane (outer diameter: 690 μm and inner diameter: 450 μm) was subjected to the same determination as in Example 1.

COMPARATIVE EXAMPLE 7

In Example 2, a film-forming solution having the following components was used.

|  | % by weight |
| --- | --- |
| Polymetaphenylene isophthalamide (Cornex) | 10.66 |
| Calcium chloride | 6.93 |
| Polyvinylpyrrolidone (average molecular weight 40,000) | 7.78 |
| Dimethyl acetamide | 74.63 |

The resulting polymetaphenylene isophthalamide porous hollow fiber membrane (outer diameter: 660 μm and inner diameter: 420 μm) was subjected to the same determination as in Example 1.

COMPARATIVE EXAMPLE 8

In Example 2, a film-forming solution having the following components was used.

|  | % by weight |
| --- | --- |
| Polymetaphenylene isophthalamide (Cornex) | 16.74 |
| Calcium chloride | 3.36 |
| Polyvinylpyrrolidone (average molecular weight 40,000) | 7.55 |
| Dimethyl acetamide | 72.35 |

It was found that polymetaphenylene isophthalamide in the film-forming solution was not dissolved completely.

COMPARATIVE EXAMPLE 9

In Example 2, a film-forming solution having the following components was used.

|  | % by weight |
| --- | --- |
| Polymetaphenylene isophthalamide (Cornex) | 15.36 |
| Calcium chloride | 11.37 |
| Polyvinylpyrrolidone (average molecular weight 40,000) | 6.92 |
| Dimethyl acetamide | 66.35 |

It was found that polymetaphenylene isophthalamide and calcium chloride in the film-forming solution was not dissolved completely.

COMPARATIVE EXAMPLE 10

In Example 2, polyvinylpyrrolidone (average molecular weight 10,000) was used in the same proportion in place of the polyvinylpyrrolidone (average molecular weight 40,000), and the resulting polymetaphenylene isophthalamide porous hollow fiber membrane (outer diameter: 670 μm and inner diameter: 440 μm) was subjected to the same determination as in Example 1.

COMPARATIVE EXAMPLE 11

In Example 2, polyvinylpyrrolidone (average molecular weight 120,000) was used in the same proportion in place of the polyvinyl-pyrrolidone (average molecular weight 40,000). The film-forming solution had a very high viscosity, so that spinning was difficult to conduct.

COMPARATIVE EXAMPLE 12

In Example 2, a film-forming solution having the following components was used.

|  | % by weight |
| --- | --- |
| Polymetaphenylene isophthalamide (Cornex) | 16.82 |
| Calcium chloride | 6.75 |
| Polyvinylpyrrolidone (average molecular weight 40,000) | 3.74 |
| Dimethyl acetamide | 72.69 |

The resulting polymetaphenylene isophthalamide porous hollow fiber membrane (outer diameter: 670 μm and inner diameter: 440 μm) was subjected to the same determination as in Example 1.

COMPARATIVE EXAMPLE 13

In Example 2, a film-forming solution having the following components was used.

|  | % by weight |
| --- | --- |
| Polymetaphenylene isophthalamide (Cornex) | 15.47 |
| Calcium chloride | 6.21 |

-continued

|  | % by weight |
|---|---|
| Polyvinylpyrrolidone (average molecular weight 40,000) | 11.46 |
| Dimethyl acetamide | 66.86 |

It was found that the film-forming solution had a very high viscosity, so that spinning was difficult to conduct.

Results of determination in the foregoing Examples 2 to 4 and Comparative Examples 7, 10 and 12 are shown in the following Table 2.

TABLE 2

|  | $P_{H2O}$ [cm³(STP)/cm² · sec · cmHg] | $P_{AIR}$ [cm³(STP)/cm² · sec · cmHg] | $\alpha_{H2O/AIR}$ |
|---|---|---|---|
| Ex. 2 | $4.6 \times 10^{-3}$ | $2.8 \times 10^{-8}$ | 160000 |
| Ex. 3 | $5.2 \times 10^{-3}$ | $5.7 \times 10^{-8}$ | 91000 |
| Ex. 4 | $3.1 \times 10^{-4}$ | $5.8 \times 10^{-9}$ | 53000 |
| Comp. Ex. 7 | $6.1 \times 10^{-3}$ | $3.6 \times 10^{-5}$ | 170 |
| Comp. Ex. 10 | $2.9 \times 10^{-3}$ | $1.5 \times 10^{-7}$ | 19000 |
| Comp. Ex. 12 | $2.5 \times 10^{-3}$ | $2.4 \times 10^{-7}$ | 10000 |

INDUSTRIAL UTILITY

The present polymetaphenylene isophthalamide porous hollow fiber membrane has distinguished resistance to moisture and heat and humidifying characteristics, and also has good mechanical strength and gas barrier performance, and thus can be used as an effective humidifying membrane and more particularly as a suitable humidifying membrane for polymer electrolyte fuel cells, especially polymer electrolyte fuel cells for mobile unit, or can be used also in dehumidifying apparatuses, etc.

As to the resistance to moisture and temperature and mechanical strength, the porous hollow fiber membrane resulting from the wet heat treatment in a wet and heated atmosphere at the temperature of 100° C. and the humidity of 80% for 1,000 hours or more has a strength at break of 10 MPa or more and a elongation at break of 80% or more. The elongation at break can keep at least 80% as high as that before the wet heat treatment.

When the resulting porous hollow fiber membrane is subjected to heat treatment in water at 80° C. or higher before the moisture retention treatment following the dry-and-wet spinning, not only the separation factor $\alpha_{H2O/AIR}$ is increased, but also damage of membrane module due to use in a high temperature circumstance and dissolution of inorganic ions remaining in the membrane can be prevented.

The invention claimed is:

1. A process for producing a polymetaphenylene isophthalamide porous hollow fiber which comprises extruding a film-forming solution comprising 12 to 35 wt.% polymetaphenylene isophthalamide, 4 to 10 wt.% polyvinylpyrrolidone, 4 to 10 wt.% of an inorganic salt and a balance of an aprotic polar solvent through a concentric double annular spinning nozzle, while keeping the film-forming solution at 70° C. or higher, thereby conducting dry-and-wet spinning, followed by a moisture retention treatment.

2. A process of producing a polymetaphenylene isophthalamide porous hollow fiber membrane according to claim 1, wherein the polyvinylpyrrolidone has an average molecular weight of 20,000 to 100,000.

3. A process of producing a polymetaphenylene isophthalamide porous hollow fiber membrane according to claim 1, wherein the inorganic salt is calcium chloride or a mixture of calcium chloride and lithium chloride.

4. A process of producing a polymetaphenylene isophthalamide porous hollow fiber membrane according to claim 1, wherein the resulting porous hollow fiber membrane obtained by the dry-and-wet spinning is subjected to heat treatment in water at 80° C. or higher before the moisture retention treatment.

5. A process of producing a polymetaphenylene isophthalamide porous hollow fiber membrane according to claim 4, wherein the heat treatment is carried out in water at 80° C. to 121° C.

6. A process of producing a polyrnetaphenylene isophtbalamide porous hollow fiber membrane according to claim 1, wherein the polyvinylpyrrolidone has an average molecular weight of 20,000 to 100,000.

7. A process of producing a polymetaphenylene isophthalamide porous hollow fiber membrane according to claim 1, wherein the inorganic salt is calcium chloride or a mixture of calcium chloride and lithium chloride.

* * * * *